Patented Oct. 12, 1926.

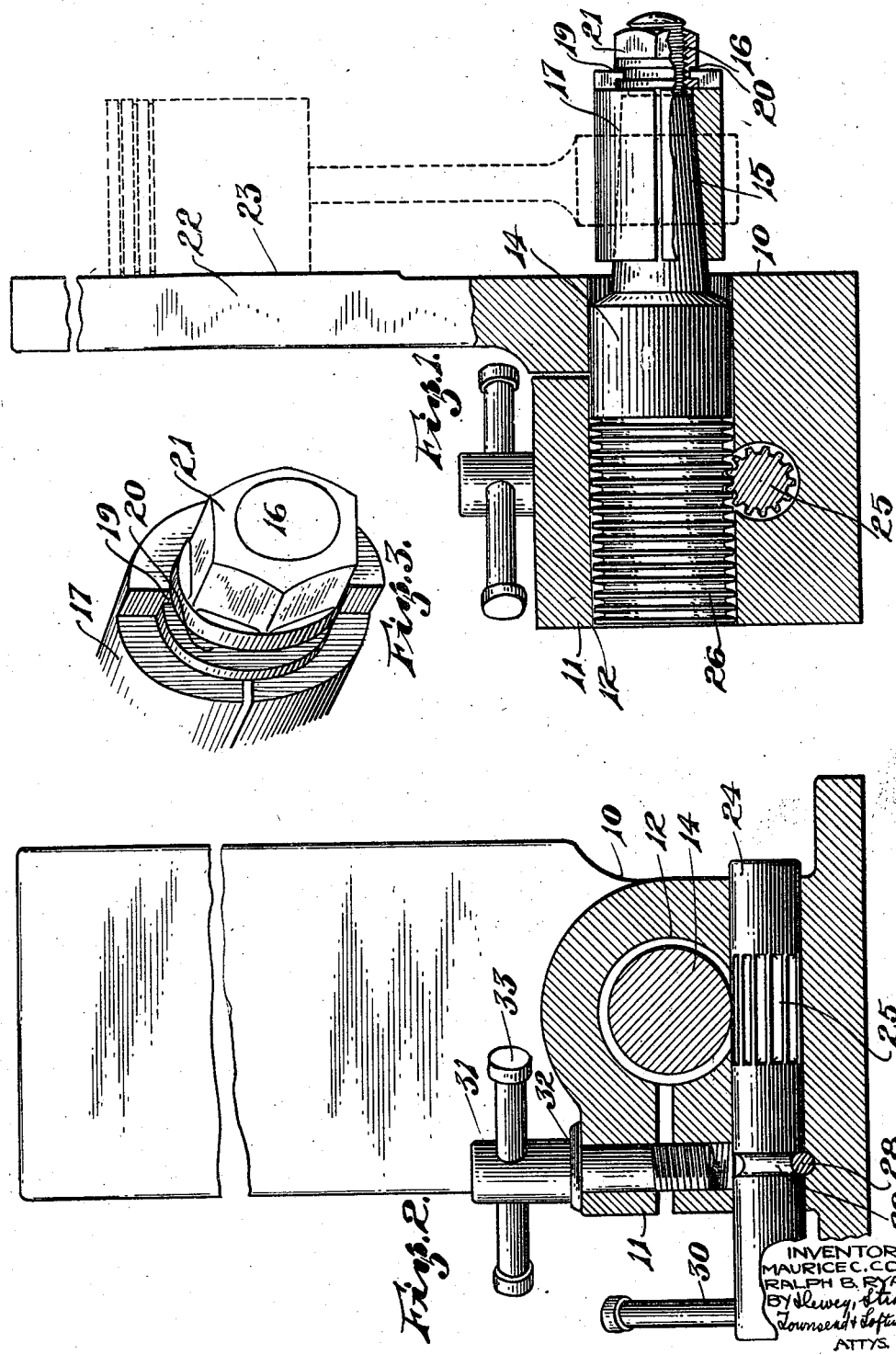

1,603,070

UNITED STATES PATENT OFFICE.

MAURICE C. COX AND RALPH B. RYAN, OF OAKLAND, CALIFORNIA.

ALIGNING AND FITTING JIG FOR CONNECTING RODS.

Application filed February 11, 1925. Serial No. 8,417.

This invention relates to machine tools and particularly pertains to an aligning and fitting jig for connecting rods of internal combustion motors.

It is the principal object of the present invention to provide a generally improved device of the character described which will facilitate and simplify the operations of aligning pistons on connecting rods and fitting connecting rod bearings.

In carrying out this object we provide a device including a mandrel having a portion which may be expanded or contracted to snugly receive the bearing of a connecting rod or the like. The mandrel may be rotated and moved axially or it may be clamped in a set position. The mandrel is arranged at right angles to a face plate for use in aligning pistons on connecting rods.

One form which the invention may assume is exemplified in the following description and illustrated by way of example in the accompanying drawings, in which:

Fig. 1 is a view in vertical and longitudinal section of a device embodying the preferred form of our invention.

Fig. 2 is a transverse section through the device taken on line 2—2 of Fig. 1.

Fig. 3 is a fragmentary view in perspective of the connection between the mandrel sleeve and its nut.

Referring more particularly to the accompanying drawings, 10 indicates a frame having a bottom flange by which it may be bolted or otherwise secured to a work bench. The frame 10 is formed with a partially split bearing 11 having a bore 12 which slidably and rotatably receives the shank of a mandrel 14. This mandrel is formed with a tapered end 15 which terminates in a threaded portion 16. A mandrel sleeve 17 is provided and is formed with a tapered bore coinciding with the tapered end of the mandrel. This mandrel sleeve 17 is split so that it will expand and contract as it is moved axially on the tapered end of the mandrel.

To move the mandrel sleeve axially on the mandrel, it is formed at its outer end with a semi-annular lip 19 which engages an annular groove 20 formed in a nut 21. This nut is threaded on the threaded extremity of the mandrel. It is obvious that when the nut is rotated the mandrel sleeve will move axially in unison therewith and will expand or contract depending upon which direction it is moved.

By adjusting the nut 21 the diameter of the mandrel sleeve may be expanded or contracted to snugly fit the bearing of a connecting rod when fitting the bearing or when aligning a piston on the rod with the bearing. To assist in the latter operation, a vertical face plate 22 is formed integral with one end of the bearing 11. The working surface 23 of the face plate 22 is exactly at right angles to the longitudinal axis of the mandrel. Therefore, when the connecting rod bearing is snugly fitted on the mandrel sleeve, the side wall of a piston thereon should align with the working surface 23 of the face plate 22. Should it not align therewith, the rod is bent until a perfect alignment between the surfaces is effected.

During the operation just described it is often necessary to frequently move the mandrel axially to move the piston toward and away from the surface of the face plate. To facilitate this, we have provided means for axially moving the mandrel. The means mentioned comprises a shaft 24 journaled in the frame 10 beneath and at right angles to the mandrel 14. The shaft 24 is formed with a pinion 25 which meshes with rack teeth 26 formed on the shank of the mandrel 14. These rack teeth are formed completely around the mandrel so that the mandrel may be rotated as desired without affecting the toothed engagement between it and the pinion 25.

The shaft 24 is held from axial movement by a pin 28 in the frame which engages an angular groove 29 formed adjacent one end of the shaft. This end of the shaft projects a distance from the side of the frame and is fitted with a hand bar 30 so that it may be rotated to advance or retract the mandrel sleeve relatively to the face plate 22.

During the fitting of a connecting rod bearing or when reaming the wrist pin end thereof, it is necessary to secure the mandrel against rotative and axial movement. For this reason the bearing 10 is partially split as before stated and is fitted with a clamping screw 31. This clamping screw is formed with an enlarged upper end 32 to receive a hand bar 33. A shoulder is formed at the junction between this enlarged upper end and the shank of the screw, which shoulder bears against the upper portion of the bearing 10. The shank of the clamping screw extends through a bore in the upper portion of the bearing and threadedly engages a tapped hole in the lower portion of the bearing. It is obvious that when the screw is turned to thread its shank into the tapped hole, the upper and lower portions of the bearing will be drawn together and consequently clamp the shank of the mandrel between them.

In operation of the device, when using it to fit bearings, the mandrel is clamped in the bearing 10 and the mandrel sleeve is adjusted on the mandrel by means of the nut 21 until it is exactly the same diameter as the crank pin on which the bearing is to be ultimately mounted. The bearing halves are then assembled on the mandrel sleeve and drawn tightly together to snugly embrace the sleeve. The bearing is then forcefully rotated about the mandrel sleeve and then removed from the mandrel. Any high spots occuring in the bearing will be burnished and may be scraped down. The above operation is then repeated until the entire surface of the bearing bears on the mandrel sleeve. As the mandrel sleeve is adjusted to the exact size of crank pin, the bearing when properly fitted may be mounted directly on the crank pin and tightened without further fitting.

The above is a considerable improvement over prior methods which required the bearing to be fitted directly on the crankshaft which often required the mechanic to work beneath the automobile in an inconvenient position.

In aligning a piston with the connecting rod bearing, the clamping screw is released to permit axial movement of the mandrel 14, and the bearing is arranged on the mandrel sleeve 17. The sleeve 17 is then expanded by means of the nut 21 to tightly grip the bearing. The shaft 24 is then rotated to move the mandrel axially to bring the wall of the piston in close proximity to the surface 23 of the face plate 22. If the two surfaces are in alignment, the sleeve 17 is contracted to release the bearing so that the rod and piston may be removed. If the wall of the piston does not align with the surface 23, the rod is bent until it does. During this operation it is necessary to frequently move the piston toward and away from the face plate. The provision of the rack and gear device for axially moving the mandrel to accomplish this, greatly facilitates the operation.

It is obvious that our device may be used in various other capacities such as supporting a connecting rod when reaming the wrist pin bearing or when fitting a wrist pin.

While we have shown the preferred form of our invention, it is to be understood that various changes in its construction may be made by those skilled in the art without departing from the invention as defined in the appended claims.

Having thus described our invention, what we claim and desire to secure by Letters Patent is:

1. A device of the character described comprising a frame, a mandrel carried thereby, a face plate on the frame disposed at right angles to the axis of the mandrel, operative means for reciprocating the mandrel, and means for holding said mandrel stationary relatively to the frame and rendering the first named means ineffective.

2. A device of the character described comprising a frame, a mandrel normally turnably and reciprocably mounted therein, a radially expansible end on said mandrel, a face plate stationarily held on the frame adjacent said expansible end on the mandrel and at right angles thereto, and operative means for reciprocating said mandrel.

3. A device of the character described comprising a frame, a mandrel normally turnably and reciprocably mounted therein, a radially expansible end on said mandrel, a face plate stationarily held on the frame adjacent said expansible end on the mandrel and at right angles thereto, and operative means for reciprocating said mandrel, and means for holding said mandrel stationary relatively to the frame and rendering the first named means ineffective.

4. A device of the character described comprising a frame, a mandrel normally turnably and reciprocably mounted therein, a radially expansible end on said mandrel, a face plate stationarily held on the frame adjacent said expansible end on the mandrel and at right angles thereto, and operative means for reciprocating said mandrel, said means comprising rack teeth formed on the mandrel, a pinion carried by the frame and in mesh with said teeth, and means for revolving the pinion.

5. A device of the character described comprising a frame, a mandrel carried thereby, a face plate on the frame disposed at right angles to the axis of the mandrel, and means for reciprocating said mandrel, said means comprising rack teeth formed on the mandrel, a pinion carried by the frame and in mesh with said teeth, and means for revolving the pinion.

6. A device of the character described comprising a frame, a mandrel normally turnably and reciprocably mounted therein, a radially expansible end on said mandrel, a face plate stationarily held on the frame adjacent said expansible end on the mandrel and at right angles thereto, and operative means for reciprocating said mandrel, said means comprising rack teeth formed completely around said mandrel, a pinion carried by the frame in mesh with said teeth, and means for revolving the pinion.

7. A device of the character described comprising a bearing, a mandrel mounted therein, rack teeth formed completely around said mandrel, a pinion carried by the frame in mesh with said teeth, means for revolving said pinion, said mandrel having a tapered end normally projecting from the bearing, an expansible and contractile sleeve having a tapered bore fitting said tapered end of the mandrel, and means for moving said sleeve axially on said tapered portion to expand or contract said sleeve.

8. A device of the character described comprising a bearing, a mandrel mounted therein, rack teeth formed completely around said mandrel, a pinion carried by the frame in mesh with said teeth, means for revolving said pinion, said mandrel having a tapered end normally projecting from the bearing, an expansible and contractile sleeve having a tapered bore fitting said tapered end of the mandrel, and a nut threaded on the end of the mandrel and collared to the sleeve to adjust the sleeve axially on the tapered end of the mandrel to expand or contract the sleeve.

9. A device of the character described comprising a partially split bearing, a mandrel mounted in the bearing, a clamping screw to contract the bearing to clamp the mandrel therein, rack teeth formed around said mandrel at one end thereof, a pinion mounted in the bearing in mesh with the rack teeth, means for revolving said pinion, the other end of said mandrel being tapered, a split spring sleeve having a tapered bore coinciding with the taper of the mandrel, a nut threaded on the mandrel and collared to the sleeve for axially moving the same on said tapered portion to expand or contract the sleeve.

10. A device of the character described comprising a bearing having a bore, a mandrel mounted in said bore, a face plate carried by the bearing at one end thereof and extending at right angles relatively to the axis of the mandrel, the end of said mandrel adjacent said face plate being tapered, a split sleeve having a tapered bore coinciding with said tapered end of the mandrel, and means for moving said sleeve axially on said tapered end to expand or contract the sleeve.

11. A device of the character described comprising a bearing having a bore, a mandrel mounted in said bore, a face plate at one end of the mandrel and extending at right angles to the axis of the mandrel, the end of the mandrel adjacent the face plate being tapered, a split sleeve having a bore coinciding with the taper of the mandrel end, a nut collared to said sleeve and threaded on the mandrel to move the sleeve axially on said tapered portion to expand and contract the sleeve.

12. A device of the character described comprising a bearing having a bore, a mandrel mounted in said bore, a face plate at one end of the mandrel and extending at right angles to the axis of the mandrel, the end of the mandrel adjacent the face plate being tapered, a split sleeve having a bore coinciding with the taper of the mandrel end, a nut collared to said sleeve and threaded on the mandrel to move the sleeve axially on said tapered portion to expand and contract the sleeve, the other end of said mandrel being formed with circumscribing rack teeth, a pinion mounted in the bearing in mesh with said teeth, and means for revolving the pinion to reciprocate the mandrel.

13. A device of the character described comprising a bearing having a bore, a mandrel mounted in said bore, a face plate at one end of the mandrel and extending at right angles to the axis of the mandrel, the end of the mandrel adjacent the face plate being tapered, a split sleeve having a bore coinciding with the taper of the mandrel end, a nut collared to said sleeve and threaded on the mandrel to move the sleeve axially on said tapered portion to expand and contract the sleeve, the other end of said mandrel being formed with circumscribing rack teeth, a pinion mounted in the bearing in mesh with said teeth, and means for revolving the pinion to reciprocate the mandrel, said bearing being partially split, and a clamping screw to contract the bearing to clamp the mandrel stationary and render the rack and pinion inoperative.

MAURICE C. COX.
RALPH B. RYAN.